US012770900B2

(12) United States Patent
Oh et al.

(10) Patent No.: US 12,770,900 B2
(45) Date of Patent: Oct. 20, 2026

(54) FUEL CELL HUMIDIFIER

(71) Applicant: KOLON INDUSTRIES, INC., Seoul (KR)

(72) Inventors: Young Seok Oh, Seoul (KR); Ah Reum Lee, Seoul (KR); Ji Yoon Lee, Seoul (KR); Kyoung Ju Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 500 days.

(21) Appl. No.: 18/263,528

(22) PCT Filed: Mar. 3, 2022

(86) PCT No.: PCT/KR2022/002968
§ 371 (c)(1),
(2) Date: Jul. 29, 2023

(87) PCT Pub. No.: WO2022/191496
PCT Pub. Date: Sep. 15, 2022

(65) Prior Publication Data
US 2024/0120511 A1 Apr. 11, 2024

(30) Foreign Application Priority Data
Mar. 9, 2021 (KR) ........................ 10-2021-0030627

(51) Int. Cl.
*H01M 8/04119* (2016.01)

(52) U.S. Cl.
CPC ... *H01M 8/04164* (2013.01); *H01M 8/04141* (2013.01); *H01M 8/04149* (2013.01)

(58) Field of Classification Search
CPC ......... H01M 8/04164; H01M 8/04141; H01M 8/04149; B01D 2313/083; B01D 2313/205; B01D 63/02; Y02E 60/50
See application file for complete search history.

(56) References Cited

U.S. PATENT DOCUMENTS

| | | | |
|---|---|---|---|
| 4,860,547 | A | 8/1989 | Maldague |
| 7,264,233 | B2 | 9/2007 | Katagiri |

(Continued)

FOREIGN PATENT DOCUMENTS

| | | | |
|---|---|---|---|
| EP | 3 054 515 | A | 8/2016 |
| JP | H09-022717 | A | 1/1997 |

(Continued)

OTHER PUBLICATIONS

KR NOA dated May 1, 2025.

(Continued)

*Primary Examiner* — Daniel H Lee
(74) *Attorney, Agent, or Firm* — Harvest IP Law, LLP

(57) ABSTRACT

The present invention relates to a fuel cell humidifier which can prevent condensate water from entering a running fuel cell stack. A fuel cell humidifier according to an embodiment of the present invention comprises: a humidification module; a first cap having an air discharge port for supplying air humidified by the humidification; a second cap having an air inlet port for receiving the air supplied from the outside; a bypass tube for transferring condensate water, which is generated in the interior space of the first cap or flows into the interior space of the first cap from the hollow fiber membranes, to the interior space of the housing where the off-gas flows; and a condensation inducing part extending from the air discharge port to expand the humidified air so as to induce condensation of condensate water while slowing down the speed thereof.

8 Claims, 2 Drawing Sheets

(56) References Cited

U.S. PATENT DOCUMENTS

| | | | | |
|---|---|---|---|---|
| 10,158,129 | B2 | 12/2018 | Kim | |
| 2016/0240870 | A1* | 8/2016 | Kim | B01D 71/68 |
| 2021/0111420 | A1* | 4/2021 | Ahn | H01M 8/04149 |

FOREIGN PATENT DOCUMENTS

| | | | |
|---|---|---|---|
| JP | 2000-090954 | A | 3/2000 |
| JP | 2003-288924 | A | 10/2003 |
| JP | 2005337539 | A | 12/2005 |
| JP | 2006-147484 | A | 6/2006 |
| JP | 2012-164516 | A | 8/2012 |
| JP | 2016-533258 | A | 10/2016 |
| JP | 2020-512664 | A | 4/2020 |
| KR | 10-1755516 | B1 | 7/2017 |
| KR | 10-1755891 | B1 | 7/2017 |
| KR | 10-1755916 | B1 | 7/2017 |
| KR | 20180048003 | A | 5/2018 |
| KR | 2018-0099034 | A | 9/2018 |
| KR | 20180109108 | A | 10/2018 |

OTHER PUBLICATIONS

European Search Report for a corresponding EP patent application, dated Sep. 9, 2024.
Office Action from Japanese Patent Office for a corresponding JP patent application, dated Sep. 18, 2024.
Office Action from Korean Patent Office for a corresponding KR patent application, dated Sep. 6, 2024.

* cited by examiner

FUEL CELL HUMIDIFIER

CROSS REFERENCE TO RELATED APPLICATION(S)

This application is a National Stage of International Application No. PCT/KR2022/002968 filed on Mar. 3, 2022, claiming priority based on Korean Patent Application No. 10-2021-0030627 filed on Mar. 9, 2021, the disclosure of which is incorporated herein by reference in their entirety.

TECHNICAL FIELD

The present invention relates to a fuel cell humidifier, and more particularly, to a fuel cell humidifier capable of preventing condensate water from flowing into a fuel cell stack in operation.

BACKGROUND ART

A fuel cell is a device that generates electricity while generating water by reacting hydrogen, which is a fuel, with oxygen in the air. High-purity hydrogen is supplied from a hydrogen storage tank to an anode of a fuel cell stack, and atmospheric air is supplied to a cathode of the fuel cell stack through an air supply device such as a blower.

The hydrogen supplied to the anode of the fuel cell stack is separated into hydrogen ions and electrons. The hydrogen ions move to the cathode through a polymer electrolyte membrane between the anode and cathode, and the electrons move to the cathode through an external conductor. Oxygen supplied to the cathode of the fuel cell stack is coupled to the electrons and the hydrogen ions to generate electrical energy while generating water.

When ion conductivity of the polymer electrolyte membrane of the fuel cell stack is higher, the hydrogen ions can be better transferred from the anode to the cathode. The ion conductivity of the polymer electrolyte membrane is closely related to moisture content. That is, when the polymer electrolyte membrane is sufficiently wet, the hydrogen ions can be better transferred from the anode to the cathode.

Therefore, it is necessary to prevent the efficiency of power generation of the fuel cell from being rapidly degraded, by continuously supplying moisture to the polymer electrolyte membrane when the fuel cell is in operation, to maintain the moisture content at a certain level or higher. To this end, a humidifier capable of providing moisture to air supplied to the cathode of the fuel cell stack is adopted.

The fuel cell humidifier humidifies air supplied from the outside with moisture in an off-gas discharged from the cathode of the stack, and supplies the humidified air to the cathode of the stack.

As the humidified air comes into contact with a physical structure (for example, hollow fiber membranes for humidification or a passage structure through which the humidified air flows) of the humidifier, condensate water is inevitably caused in the humidifier. When the condensate water flows into the fuel cell stack in operation, degradation of the efficiency of power generation is caused. Therefore, a means for preventing condensate water from flowing into the fuel cell stack in operation should be devised.

U.S. Pat. No. 7,264,233 (hereinafter referred to as "233 patent) discloses a humidifier 1 capable of transferring condensate water accumulated in a lower area (a liquid pool area) 33 inside a downstream head 3 through which humidified air flows to a lead-in manifold 5 through which an off-gas flows. To this end, the humidifier 1 of the "233 patent includes a communicating tube 6 that connects the lower area (the liquid pool area) 33 in which the condensate water is accumulated to the lead-in manifold 5. That is, it is assumed that the condensate water is dropped due to gravity and necessarily collected in the lower area (referred to as a "liquid pool area") 33 inside a downstream head 3.

However, the "233 patent overlooks that (i) condensate water is generated even in hollow fiber membranes 42 in which humidification is performed, and (ii) when external air is suddenly supplied at high pressure by switching from a low current mode to a high current mode, the condensate water remaining in the hollow fiber membranes 42 is discharged from the hollow fiber membranes 42 together with the high pressure air, and then, is directly discharged from the humidifier 1 without passing through the lower area inside the downstream head 3 and flows into the fuel cell stack. That is, in the "233 patent, a considerable amount of condensate water still flows into the fuel cell stack in operation, and thus the deterioration in the efficiency of power generation cannot be prevented.

Further, since communicating tube 6 of the "233 patent formed on the downstream head 3 is exposed to the outside, there is a high risk of the condensate water freezing inside the communicating tube 6 in an extremely cold environment. The freezing of the condensate water inside the communicating tube 6 hinders the condensate water collected in the lower area (the liquid pool area) 33 inside the downstream head 3 from exiting from the lower area (the liquid pool area) 33 through the communicating tube 6, and as a result, the condensate water flows into the fuel cell stack, causing degradation of the efficiency of power generation.

Meanwhile, Korean Patent Application Publication No. 2018-0109108 (hereinafter referred to as the "108 patent), which supplements the problems of U.S. Pat. No. 7,264,233, has been disclosed. The "108 patent discloses a bypass tube for transferring condensate water generated in a first cap on the fuel cell stack side or flowing into the first cap to an internal space of a housing through which an off-gas flows, and a rib provided inside an air outlet port to prevent the condensate water from being transferred to the fuel cell stack through the air outlet port, or a screw thread structure with which the rib can be replaced.

According to the "108 patent, part of the condensate water contained in the humidified air flowing into the fuel cell stack can be removed by the rib (or the screw structure), but there is a limit in that condensate water contained in humidified air that does not pass near the rib (or the screw structure) is not removed. That is, condensate water contained in the humidified air flowing through a portion adjacent to an inner circumferential surface of the air outlet port in the humidified air flowing into the fuel cell stack can be removed, but there is a limit in that condensate water contained in the humidified air flowing through a central portion of the air outlet port cannot be removed.

DISCLOSURE

Technical Problem

The present invention relates to a fuel cell humidifier capable of preventing problems caused by limitations and disadvantages of the related art as described above, and an object of the present invention is to provide a fuel cell humidifier capable of preventing condensate water from flowing into a fuel cell stack in operation.

Technical Solution

A fuel cell humidifier according to an embodiment of the present invention includes a humidification module including a housing including an off-gas inlet port through an off-gas discharged from a fuel cell stack flows into the inside and an off-gas outlet port for discharging the off-gas, and a plurality of hollow fiber membranes disposed inside the housing, the humidification module including first and second ends; a first cap including an air outlet port supplying air humidified by the humidification module to the fuel cell stack, the first cap being coupled to the first end; a second cap including an air inlet port for receiving the air supplied from the outside, the second cap being coupled to the second end; a bypass tube configured to transfer condensate water generated in an internal space of the first cap or flowing into the internal space of the first cap from the hollow fiber membranes, to an internal space of the housing through which the off-gas flows; and a condensation induction portion formed to extend from the air outlet port to expand the humidified air and induce condensation of the condensate water while slowing down the speed thereof.

In the fuel cell humidifier according to the embodiment of the present invention, the condensation induction portion may be a hollow structure having a larger diameter than the air outlet port.

In the fuel cell humidifier according to the embodiment of the present invention, the condensation induction portion may be a hollow structure having a larger cross-sectional area than the air outlet port.

In the fuel cell humidifier according to the embodiment of the present invention, the air outlet port and the condensation induction portion may be formed to be inclined at a preset angle in a direction of the fuel cell stack.

In the fuel cell humidifier according to the embodiment of the present invention, a rib configured to prevent the condensate water from being transferred to the fuel cell stack through the air outlet port may be formed inside the air outlet port.

In the fuel cell humidifier according to the embodiment of the present invention, the condensation induction portion may be formed at a stage behind the rib to remove condensate water not removed by the rib through condensation induction.

In the fuel cell humidifier according to the embodiment of the present invention, a screw thread providing a spiral path for the condensate water may be formed on an inner surface of the air outlet port.

In the fuel cell humidifier according to the embodiment of the present invention, the condensation induction portion may be formed at a stage behind the screw thread to remove condensate water not removed by the screw thread through condensation induction.

In the fuel cell humidifier according to the embodiment of the present invention, the bypass tube may include a first tube fixed to the first cap and a second tube fixed to the humidification module, the first and second tubes being detachably coupled.

Other specific matters of implementation examples according to various aspects of the present invention are included in the detailed description below.

Advantageous Effects

According to an embodiment of the present invention, it is possible to prevent condensate water from flowing into a fuel cell stack in operation, thereby preventing the efficiency of power generation from being degraded due to flowing of the condensate water into the fuel cell stack.

Further, the condensation induction portion, which is a configuration of the present invention, can increase relative humidity of humidified air to remove condensate water contained in humidified air flowing through a central portion of the air outlet port, thereby more effectively preventing the efficiency of power generation from being degraded due to flowing of the condensate water into the fuel cell stack.

MODE FOR DISCLOSURE

Since various changes may be made to the present invention, which may have several embodiments, specific embodiments will be illustrated and described in detail herein. However, it will be understood that this is not intended to limit the present invention to the specific embodiments, and all changes, equivalents, or substitutions included in the spirit and scope of the present invention are included.

The terms used herein are used for the purpose of describing specific embodiments only and are not intended to limit the present invention. The singular expressions "a," "an" and "the" include the plural expressions, unless the context clearly indicates otherwise. It will be understood that the terms "include" or "have" herein specify the presence of features, numbers, steps, operations, components, parts or combinations thereof described herein, but do not preclude the presence or addition of one or more other features, numbers, steps, operations, components, parts or combinations thereof. Hereinafter, a gasket assembly and a fuel cell membrane humidifier including the same according to embodiments of the present invention will be described with reference to the drawings.

Figure 1:
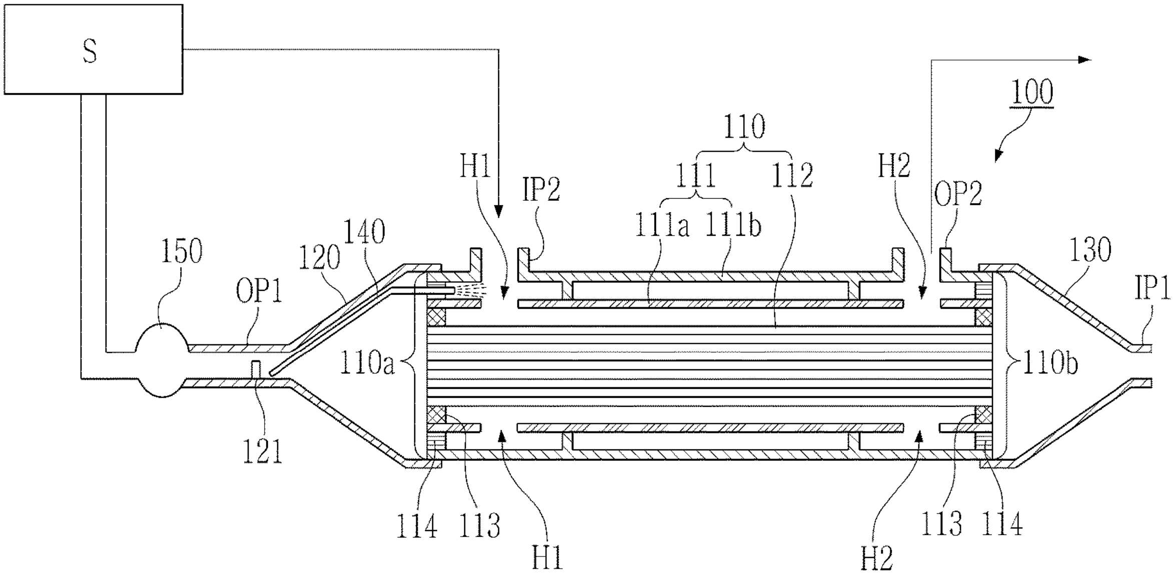
FIG. 1 is a cross-sectional view of a fuel cell humidifier according to a first embodiment of the present invention.
Figure 2:
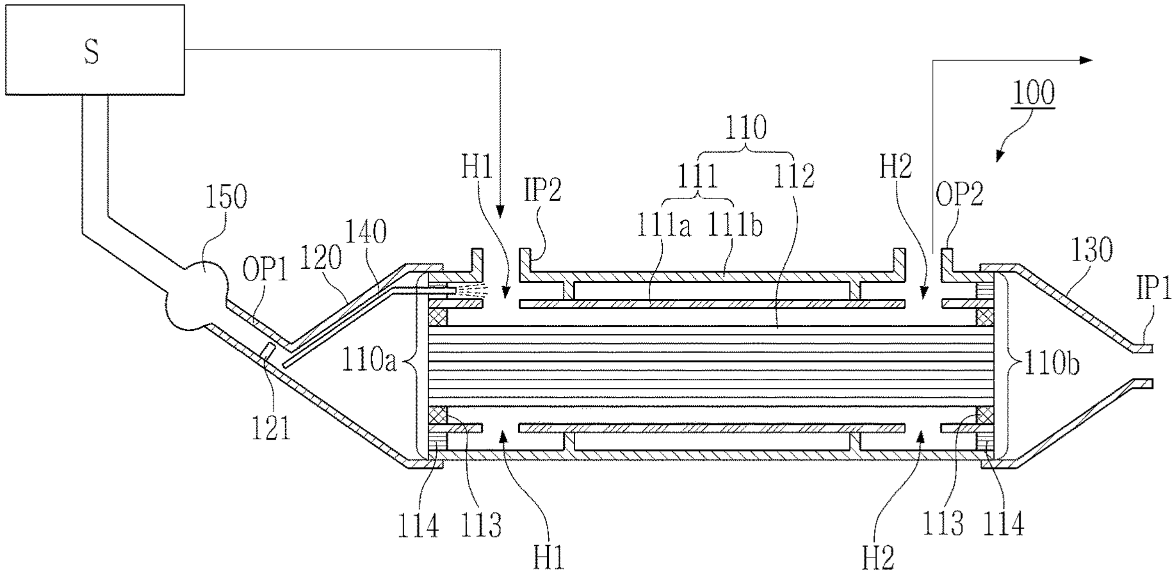
FIG. 2 is a cross-sectional view of a fuel cell humidifier according to a second embodiment of the present invention.
Figure 3:
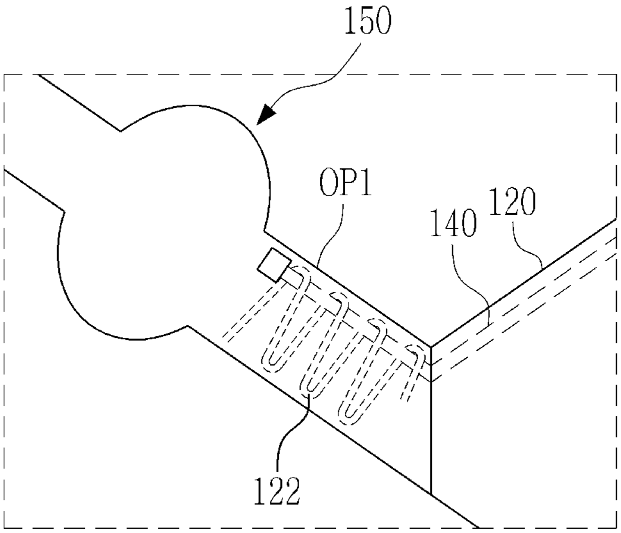
FIG. 3 is a cross-sectional view illustrating a portion of a fuel cell humidifier according to a third embodiment of the present invention.
Figure 4:
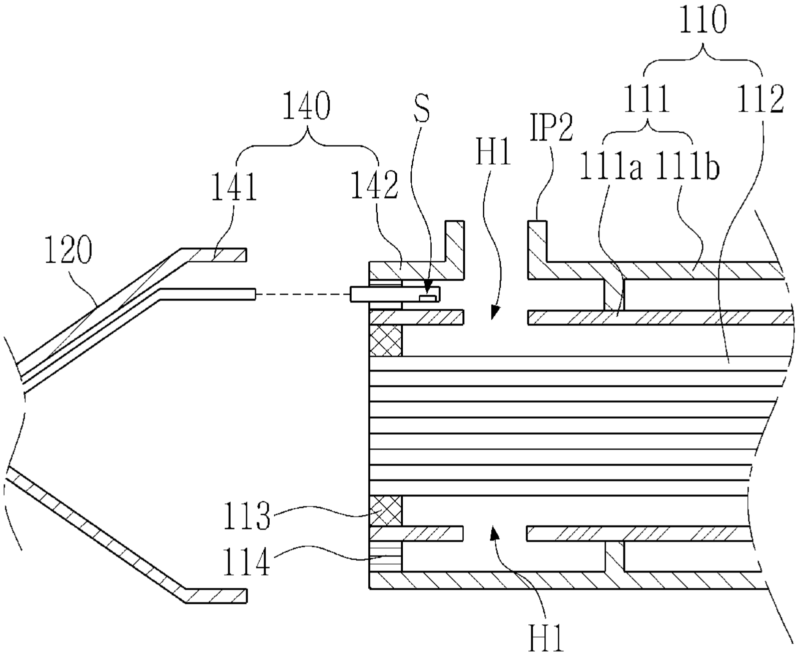
FIG. 4 is a cross-sectional view of an alternative embodiment of a bypass tube.

FIG. 1 is a cross-sectional view of a fuel cell humidifier according to a first embodiment of the present invention, FIG. 2 is a cross-sectional view of a fuel cell humidifier according to a second embodiment of the present invention, FIG. 3 is a cross-sectional view illustrating a portion of a fuel cell humidifier according to a third embodiment of the present invention, and FIG. 4 is a cross-sectional view illustrating an alternative embodiment of a bypass tube.

A fuel cell humidifier 100 of the present invention is a device that humidifies air supplied from the outside with moisture in an off-gas discharged from a fuel cell stack S, and supplies the humidified air to the fuel cell stack S.

As illustrated in FIG. 1, the humidifier 100 of the present invention includes a humidification module 110 including first and second ends 110*a* and 110*b*, a first cap 120 including an air outlet port OP1 for supplying humidified air to the fuel cell stack S and coupled to the first end 110*a*, and a second cap 130 including an air inlet port IP1 for receiving air supplied from the outside and coupled to the second end 110*b*.

The humidification module 110 includes a housing 111, and a plurality of hollow fiber membranes 112 disposed inside the housing 111. The housing 111 includes an off-gas inlet port IP2 for receiving an off-gas from the fuel cell stack S, and an off-gas outlet port OP2 for discharging the off-gas.

As illustrated in FIG. 1, the housing 111 according to the embodiment of the present invention surrounds a first housing 111*a* in which hollow fiber membranes 112 are accommodated, and a second housing 111*b* that surrounds the first housing 111*a* and has an off-gas inlet port IP2 and an off-gas outlet port OP2, and the first housing 111*a* includes a first group of openings H1 corresponding to the off-gas inlet port IP2 and a second group of openings H2 corresponding to the off-gas outlet port OP2.

Both ends of the hollow fiber membranes 112 are potted on first fixing layers 113 formed at both ends of the first housing 111*a*, and both the ends of the first housing 111*a* are fixed to both ends of the second housing 111*b* through second fixing layers 114, respectively. The second fixing layers 114 may be a gasket assembly that airtightly couple the first housing 111*a* and the second housing 111*b* through mechanical assembly.

Alternatively, the housing 111 of the present invention may be a single housing in which the hollow fiber membranes 112 are accommodated. In this case, both the ends of the hollow fiber membranes 112 may be potted on fixing layers respectively formed in both ends of a single housing, respectively.

According to another embodiment of the present invention, the hollow fiber membranes 112 may include two or more hollow fiber membrane bundles, and the housing 111 includes two or more first housings 111*a* each in which two or more hollow fiber membrane bundles are accommodated, and a second housing 111*b* that surrounds the first housings 111*a* and includes an off-gas inlet port IP2 and an off-gas outlet port OP2, and each of the first housings 111*a* may include a first group of openings H1 corresponding to the off-gas inlet port IP2 and a second group of openings H2 corresponding to the off-gas outlet port OP2.

According to the present invention, an internal space of the first cap 120 and an internal space of the second cap 130 are in fluid communication with each other only through hollows (lumens) of the hollow fiber membranes 112. The internal space of the first cap 120 is defined by an inner surface of the first cap 120 and the first end 110*a* of the humidification module 110, and the internal space of the second cap 130 is defined by an inner surface of the second cap 130 and the second end 110*b* of the humidification module 110.

An off-gas flowing into the housing 111 through the off-gas inlet port IP2 flows in an internal space of the housing 111, comes into contact with the hollow fiber membranes 112, and then, is discharged to the outside of the housing 111 through the off-gas outlet port OP2.

Air flowing into the internal space of the second cap 130 from the outside through the air inlet port IP1 flows into the internal space of the first cap 120 through hollows of the hollow fiber membranes 112 and then is supplied to the fuel cell stack S through the air outlet port OP1.

When the air flows along the hollows of the hollow fiber membranes 112, moisture contained in the off-gas flowing through the internal space of the housing 111 passes through the hollow fiber membranes 112 and is transferred to the air, thereby humidifying the air, and the air humidified in this way flows into the internal space of the first cap 120 and then, is supplied to the fuel cell stack S through the air outlet port OP1.

As described above, it is necessary to prevent condensate water generated by the humidified air being condensed in the hollows of the hollow fiber membranes 112 or in the internal space of the first cap 120 from flowing into the fuel cell stack S. To this end, the fuel cell humidifier 100 of the present invention further includes a bypass tube 140 and a condensation induction portion 150, as illustrated in FIG. 1.

The bypass tube 140 transfers the condensate water generated in the internal space of the first cap 120 or flowing into the internal space of the first cap 120 from the hollow fiber membranes 112 to the internal space of the housing 111 through which the off-gas flows.

According to the present invention, one end of the bypass tube 140 is located inside the air outlet port OP1, and the other end of the bypass tube 140 is located in the internal space (that is, a space through which the off-gas flows) of the housing 111. The condensate water flowing into the inside through the air outlet port OP1 flows into the internal space of the housing 111 along the bypass tube 140 due to a difference in air pressure.

Since the condensate water generated in the internal space of the first cap 120 or flowing into the internal space of the first cap 120 from the hollow fiber membranes 112 passes through the air outlet port OP1 of the first cap 120 in order for the condensate water to move to the fuel cell stack, the one end of the bypass tube 140 is located inside the air outlet port OP1, making it possible to primarily prevent the condensate water generated due to condensation of the humidified air from flowing into the fuel cell stack.

A position of the bypass tube 140 is not particularly limited, but the bypass tube 140 may be disposed in the internal space of the first cap 120 and the internal space of the housing 111 so that the bypass tube 140 is not exposed to the outside, as illustrated in FIG. 1. When the bypass tube 140 is not exposed to the outside, it is possible to prevent the condensate water from being frozen in the bypass tube 140 even in a cold environment. Therefore, it is possible to prevent the condensate water from flowing into the fuel cell stack instead of being bypassed due to freezing of the condensate water in the bypass tube 140.

As illustrated in FIG. 1, a rib 121 for preventing the condensate water from being transferred to the fuel cell stack through the air outlet port OP1 may be provided inside the air outlet port OP1. The rib 121 prevents part of the condensate water flowing into the air outlet port OP1 from flowing toward the fuel cell stack. The condensate water whose flow is blocked by the rib 121 is collected on the side of the rib 121. Accordingly, the one end of the bypass tube 140 may be located adjacent to the rib 121, as illustrated in FIG. 1. That is, the one end of the bypass tube 140 may be located between a boundary between a body of the first cap 120 and the air outlet port OP1, and the first rib 121.

As described above, the part of the condensate water contained in the humidified air flowing into the fuel cell stack can be removed by the rib 121, but there is a limit in that the condensate water contained in the humidified air that does not pass near the rib 121 is removed.

Therefore, in the first embodiment of the present invention, the condensation induction portion 150 that is formed at a stage behind the rib 121 and is able to instantaneously expand the humidified air and induce condensation of the condensate water while slowing down the speed thereof is further included.

The condensation induction portion 150 may be a hollow structure formed to extend from the air outlet port OP1 and having a larger diameter (or cross-sectional area) than the air outlet port OP1. The condensation induction portion 150 may be an arc-shaped structure having a larger diameter than the air outlet port OP1. Of course, a shape of the condensation induction portion 150 is not limited thereto and may be any shape, and the diameter or cross-sectional area larger than the diameter or cross-sectional area of the air outlet port OP1 is sufficient. In the following description, when only "diameter" or "cross-sectional area" is referred to, this may mean "diameter or cross-sectional area".

The condensation induction portion 150 induces sudden adiabatic expansion of the humidified air flowing into the fuel cell stack S to allow inherent energy of the humidified air to be used in the form of work so that temperature is lowered according to the first law of energy. When the temperature of the humidified air is lowered, saturated humidity at the corresponding temperature is decreased and relative humidity is increased accordingly. A part of the humidified air condensed due to the increased relative humidity is made larger with the condensate water contained in the humidified air as condensation nuclei, dropped, and collected on a bottom surface of the condensation induction portion 150.

Thus, the condensation induction portion 150 can increase the relative humidity of the humidified air to remove the condensate water contained in the humidified air flowing through a central portion of the air outlet port OP1.

Meanwhile, when the condensate water is left on the bottom surface of the condensation induction portion 150, a substantial flow cross-sectional area of the condensation induction portion 150 may be reduced and a magnitude of the adiabatic expansion may be reduced, and therefore, it is preferable for the condensation induction portion 150 to maintain an originally designed cross-sectional area.

Accordingly, an air outlet port OP1 of a first cap 120 according to a second embodiment of the present invention may be formed to be inclined at a preset angle in a direction of the fuel cell stack S, as illustrated in FIG. 2. A condensation induction portion 150 may be formed to extend from an air outlet port OP1, and a central axis thereof may be formed to be inclined at a preset angle in the direction of the fuel cell stack S like the air outlet port OP1.

As in FIG. 2, the air outlet port OP1 and the condensation induction portion 150 are formed to be inclined at a preset angle in the direction of the fuel cell stack S, making it possible to prevent condensate water from being collected on a bottom surface of the condensation induction portion 150.

The condensate water condensed in the condensation induction portion 150 goes down along the air outlet port OP1 and flows into an internal space of a housing 111 through a bypass tube 140 due to a pressure difference.

Meanwhile, the rib 121 is required to have a certain size or more in order to block the flow of condensate water, and since the rib 121 has a surface perpendicular to the flow of the humidified air, there is concern that the efficiency of power generation of the fuel cell may be degraded due to excessive resistance applied to the flow of the humidified air.

To solve this problem, a first cap 120 according to a third embodiment of the present invention includes a screw thread 122 formed on an inner surface of an air outlet port OP1, as illustrated in FIG. 3. The screw thread 122 provides a spiral path for condensate water that flows into the air outlet port OP1.

The rib 121 described above may be replaced with the screw thread 122. That is, the screw thread 122 of the present invention may also be formed on the inner surface of the air outlet port OP1 extending in a direction parallel to a longitudinal direction of a hollow fiber membrane 112. As illustrated in FIG. 3, when the air outlet port OP1 is inclined so that humidified air can flow upward at a preset angle, this is more advantageous in that the condensate water flowing into the air outlet port OP1 can be guided by the screw thread 122.

In order to transfer the condensate water flowing into the air outlet port OP1 and reaching a termination portion of the screw thread 122 through the spiral path to an internal space of a housing 111, the one end of a bypass tube 140 may be located adjacent to the termination portion of the screw thread 122. That is, the one end of the bypass tube 140 may be disposed to receive the condensate water that has moved to the termination portion of the screw thread 122 through the spiral path.

However, as described above, part of the condensate water contained in the humidified air flowing into the fuel cell stack S can be removed by the screw thread 122, but there is a limit in that condensate water contained in the humidified air that does not pass near the screw thread 122 is not removed.

Therefore, in the third embodiment of the present invention, the condensation induction portion 150 that is formed at a stage behind the screw thread 122 and is able to instantaneously expand the humidified air and induce condensation of the condensate water while slowing down the speed thereof is further included.

The air outlet port OP1 and the condensation induction portion 150 are formed to be inclined at a preset angle in the direction of the fuel cell stack S, as in the second embodiment described above. The condensate water condensed in the condensation induction portion 150 goes down along the air outlet port OP1 and flows into an internal space of the housing 111 through the bypass tube 140 due to a pressure difference.

According to the third embodiment of the present invention, it is possible to prevent the efficiency of power generation of the fuel cell from being degraded due to excessive resistance applied to the flow of the humidified air, and to remove the condensate water contained in the humidified air that does not pass near the screw thread 122.

The bypass tube 140 of the present invention illustrated in FIGS. 1 to 3 may be a single monolithic tube.

Alternatively, as illustrated in FIG. 4, the bypass tube 140 of the present invention includes a first tube 141 fixed to the first cap 120 and a second tube 142 fixed to the humidification module 110, and the first and second tubes 141 and 142 may be detachably coupled. That is, when the first cap 120 is coupled to the humidification module 110, the first tube 141 can also be coupled to the second tube 142, thereby improving the convenience and production of a process of manufacturing the humidifier 100.

Although the embodiment of the present invention has been described above, those skilled in the art can variously modify or change the present invention through affixation, change, deletion, addition, or the like of components without departing from the spirit of the present invention described in the claims, and this will be said to be also included within the scope of the present invention.

DETAILED DESCRIPTION OF MAIN ELEMENTS

100: fuel cell humidifier
110: humidification module

111: housing
111*a*: first housing
111*b*: second housing
112: hollow fiber membrane
113: first fixing layer
114: second fixing layer
120: first cap
121: rib
122: screw thread
130: second cap
140: bypass tube
150: condensation induction portion

The invention claimed is:

1. A fuel cell humidifier comprising:

a humidification module including a housing including an off-gas inlet port through an off-gas discharged from a fuel cell stack flows into the inside and an off-gas outlet port for discharging the off-gas, and a plurality of hollow fiber membranes disposed inside the housing, the humidification module including first and second ends;

a first cap including an air outlet port supplying air humidified by the humidification module to the fuel cell stack, the first cap being coupled to the first end;

a second cap including an air inlet port for receiving the air supplied from the outside, the second cap being coupled to the second end;

a bypass tube configured to transfer condensate water generated in an internal space of the first cap or flowing into the internal space of the first cap from the hollow fiber membranes, to an internal space of the housing through which the off-gas flows; and a condensation induction portion formed to extend from the air outlet port to expand the humidified air and induce condensation of the condensate water while slowing down the speed thereof, wherein the air outlet port and the condensation induction portion are formed to be inclined at a preset angle in a direction of the fuel cell stack, and wherein the condensation induction portion is provided as an arc-shaped hollow structure and is formed to have a continuous incline from the air outlet port, and wherein condensate water condensed from the humidified air is collected on a bottom surface of the condensation induction portion formed as the arc-shaped hollow structure.

2. The fuel cell humidifier of claim 1, wherein the condensation induction portion is a hollow structure having a larger diameter than the air outlet port.

3. The fuel cell humidifier of claim 1, wherein the condensation induction portion is a hollow structure having a larger cross-sectional area than the air outlet port.

4. The fuel cell humidifier of claim 1, wherein a rib configured to prevent the condensate water from being transferred to the fuel cell stack through the air outlet port is formed inside the air outlet port.

5. The fuel cell humidifier of claim 4, wherein the condensation induction portion is formed at a stage behind the rib to remove condensate water not removed by the rib through condensation induction.

6. The fuel cell humidifier of claim 1, wherein a screw thread providing a spiral path for the condensate water is formed on an inner surface of the air outlet port.

7. The fuel cell humidifier of claim 6, wherein the condensation induction portion is formed at a stage behind the screw thread to remove condensate water not removed by the screw thread through condensation induction.

8. The fuel cell humidifier of claim 1, wherein the bypass tube includes a first tube fixed to the first cap and a second tube fixed to the humidification module, the first and second tubes being detachably coupled.

* * * * *